United States Patent Office 3,175,905

Patented Mar. 30, 1965

3,175,905

LIGHT SENSITIVE MATERIAL

Paul Stahlhofen, Wiesbaden, Germany, assignor, by mesne assignments, to Azoplate Corporation, Murray Hill, N.J.

No Drawing. Filed Sept. 22, 1961, Ser. No. 139,870
Claims priority, application Germany, Oct. 8, 1960, K 41,850
40 Claims. (Cl. 96—33)

A large number of light-sensitive materials for photomechanical reproduction processes are already known. For this purpose, diazo compounds have already been disclosed as very suitable.

Also, compounds of high molecular weight which contain unsaturated aromatic ketones and cinnamic acid groups and which cross-link under the influence of ultraviolet light and become insoluble have been found suitable for this purpose.

Further, polymers which are themselves light-sensitive have been proposed as reproduction layers. Layers of these polymers can be rendered insoluble by exposure to light without any sensitizers being added. The parts of this polymer layer that are not affected by the light are removed with a solvent on that a wash-out relief remains on the support.

The disadvantage of light-sensitive material of this type that has so far been used lies in the not very great mechanical strength of the developed reproduction coating, a circumstance which results in increased abrasion during the printing process and which has an adverse effect on the number of prints that can be produced. Moreover, with the light-sensitive material hitherto known, storage qualities are insufficient, particularly at temperatures somewhat above normal. The non-fulfillment of the craftsman's desire to have an image of the master appearing immediately after exposure, i.e., before development, constitutes a further deficiency, for if there is any image at this stage it is very weak only.

An improved light-sensitive material for the photomechanical preparation of printing plates consisting of a support, preferably metal or paper, and a light-sensitive coating has now been found in which the light-sensitive coating consists wholly or in part of one or more thiazolidones, substituted in the 2, 3, 5 positions.

Compounds contemplated under the heading of thiazolidones substituted in 2, 3, 5 positions are primarily those with the following general formula

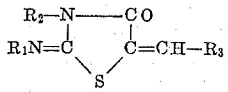

in which $R_1$ and $R_2$, for example, are aryl, aryl with simple or multiple substitution by identical or differing residues which may consist of halogens, particularly chlorine, $NO_2$, hydroxyl or alkoxy groups, dialkyl-substituted amines such as dimethylamine, diethylamine, methyl, ethyl, straight-chain, branched or cyclic saturated or unsaturated hydrocarbons with 3–14 carbon atoms which in turn may be substituted, for example with compounds containing nitrogen, and may also contain double bonds; all these residues may also be joined in the $R_1$-position by their carbon or nitrogen side chain, for example,

$R_1$ may also be an aliphatic hydrocarbon, with straight-chain or branched or cyclic, saturated or unsaturated hydrocarbons with 1–14 carbon atoms, but preferably $$-CH_2-CH=CH_2,\ -CH_2-\underset{CH_3}{\underset{|}{C}}=CH_2 \text{ and } -CH_2-CH_2-CH=CH_2$$

$R_2$ may also be, for example, hydrocarbons of 1–10 carbon atoms with substitution by hydroxyl groups, particularly hydroxyethyl, hydroxypropyl, hydroxyisobutyl and aryl with α,β-unsaturated hydrocarbon side chains which have a keto or carboxyl group in β position which may in turn be substituted, e.g.,

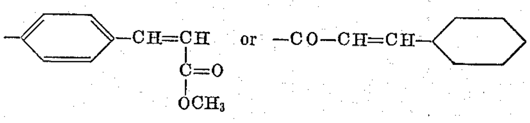

and $R_3$ is, for example, aryl, aryl with simple or multiple substitution by identical or differing residues of the following type: halogen, particularly chlorine, methyl, ethyl, straight-chain or branched, saturated or unsaturated hydrocarbons with carbon chains of 3–10 carbon atoms, with $NO_2$, hydroxyl or alkoxy groups, dialkyl-substituted amines such as dimethylamine and diethylamine; all these residues may also be joined in the $R_3$ position by their carbon chains; $R_3$ may also be, for example, the residues:

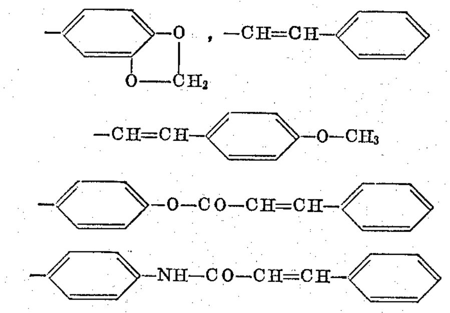

naphthyl, cycloaliphates such as cyclohexyl, cyclopentyl, furyl, vinylfuryl, pyridyl and

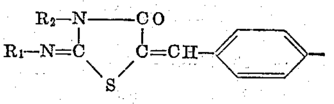

Mixtures of the thiazolidones herein named may also be used.

The thiazolidones named above are readily soluble in organic solvents such as acetone, dioxane, methyl-ethyl-ketone, dimethyl formamide and ethylene glycol monomethyl ether.

Exemplary of the thiazolidones of the invention are:

(Formula 1)

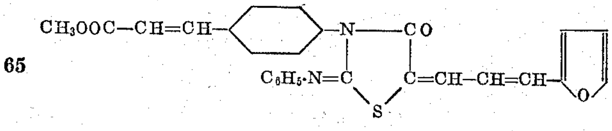

(Formula 2)

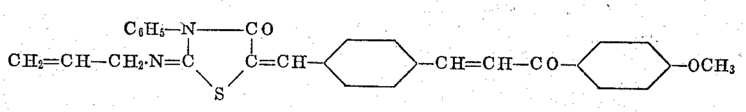

(Formula 3)

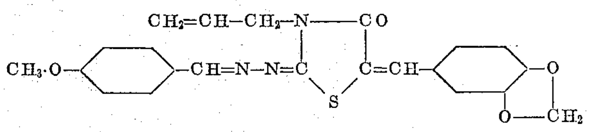

(Formula 4)

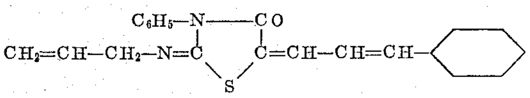

(Formula 5)

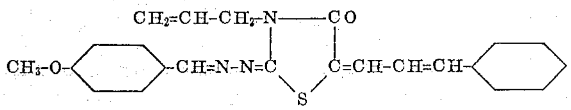

(Formula 16)

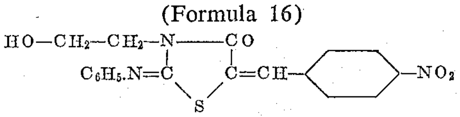

(Formula 17)

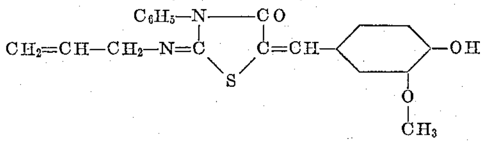

For the preparation of the thiazolidones to be used in accordance with the invention, an appropriately substituted amino compound is first reacted with phenyl or allyl mustard oil to give a thiourea derivative. Suitable amino compounds for this reaction are, for example: aminobenzene, ethanolamine, 4-amino-cinnamic acid methyl (Formula 6)

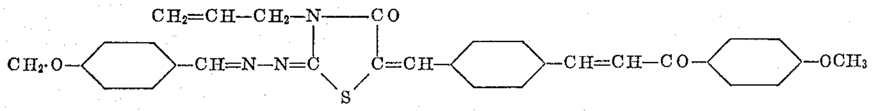

(Formula 7)

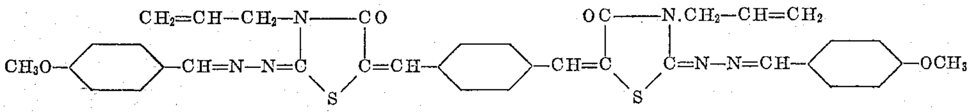

(Formula 8)

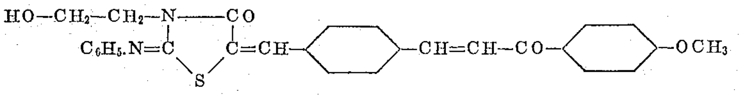

(Formula 9)

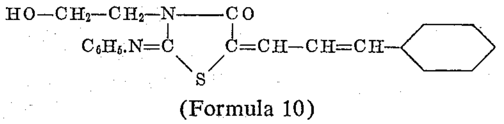

(Formula 10)

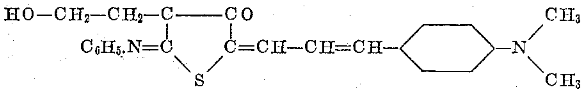

(Formula 11)

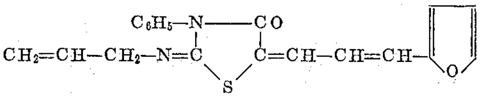

(Formula 12)

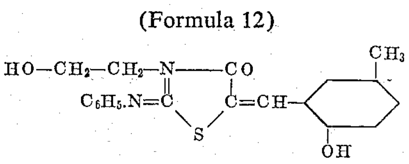

(Formula 13)

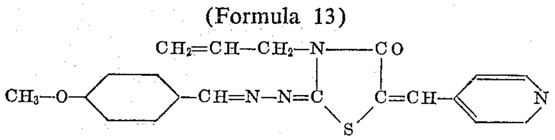

(Formula 14)

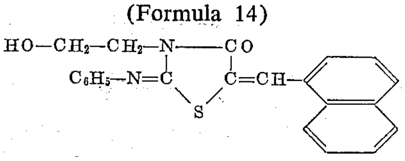

(Formula 15)

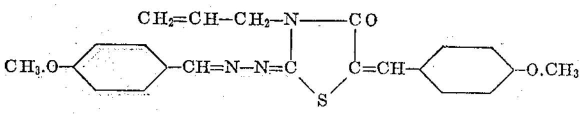

ester, 4-methoxy-ω-(4-amino-benzylidene)-acetophenone, ω-(4-amino-benzylidene)-acetophenone and 4-amino-ω-(benzylidene)-acetophenone, as also hydrazine hydrate and hydrazine derivatives.

Cyclization to the thiazolidone takes place when the appropriate thiourea is heated for 2 to 4 hours with chloroacetic acid ester in alcoholic solution or with chloracetyl chloride in acetone or benzene.

For substitution in the 5-position, the thiazolidone is condensed with a suitably substituted aromatic or heterocyclic aldehyde.

For this purpose the following are suitable: 4-methoxybenzaldehyde, 3,4 - dihydroxy-benzaldehyde, piperonal, vanillin, 4-nitro-benzaldehyde, 4-chloro-benzaldehyde, 4-methoxy-3-sulfo-benzaldehyde, pyridin-(4)-aldehyde, furfural, cinnamic aldehyde, β-furyl-(2)-acrolein, 4-dimethylamino-benzaldehyde, 4-dimethylamino cinnamic aldehyde, 4 - cinnamoylamine-benzaldehyde, 4 - cinnamoyl-hydroxybenzaldehyde, 4-(β-anisoylvinyl)-benzaldehyde, 3-methyl-6-hydroxy-benzaldehyde, 4-methylbenzaldehyde, 4-nitrocinnamicaldehyde, 4-methoxycinnamic aldehyde, and 1-naphthaldehyde.

The light-sensitive material of the invention is suitable for the preparation of planographic printing plates which give very long runs.

If required, known substances which act on the one hand as sensitizing substances and on the other as radical-forming and hence polymerization-favoring substances may be added to the compounds named. Such substances are primarily nitrogen compounds known per se and triphenylmethane, quinone and keto compounds. The following are particularly suitable: benzoin-mono-methylether, azo-diisobutyric acid nitrile, 2-methyl-anthraquinone, 1,4-naphthoquinone, 2-chloroanthraquinone, Michler's ketone and triphenyl methane dyestuffs, e.g., malachite green and crystal violet (carbinol base).

Particularly favorable results are obtained if the light-sensitive substances are applied together with water-soluble or alkali-soluble resins. An improvement in printing results is obtained in general even with small proportions of resins, e.g., with about 0.05 to 2%. However, equal quantities of resin or even more may be added, but in most cases no further improvement in printing results is obtained.

As the resins which are soluble in aqueous alkaline solution, those which are preferred are those whose solubility is fundamentally attributable to the presence of free carboxyl and acid aldehyde groups or phenolic groups. Particularly favorable results are obtained when, for example, the following compounds are used:

Natural resins such as shellac or colophony and synthetic resins such as lower phenol-formaldehyde condensation products, as also phenolformaldehyde novolaks in which the phenolic groups are completely or in part reacted with chloroacetic acid, interpolymers from maleic anhydride or maleic acid and styrene or vinyl acetate or vinyl butyl acetate or ethylene. Also, nitrated interpolymers from maleic anhydride and styrene can be used very successfully as resin additives.

For the preparation of the light-sensitive material of the invention, the appropriate solutions of the thiazolidones specified above, and, if desired, of the alkali-soluble resins are applied in known manner to supports such as foils or plates made of metal, e.g., aluminum, zinc, copper or plates produced with several of such metals, paper or glass. As the solvent for this coating, ethylene glycol monomethyl ether, ethylene glycol monoethyl ether, dimethyl formamide or aliphatic ketones have proved advantageous.

If the light-sensitive coating provided with the thiazolidones of the invention, is exposed image-wise, e.g., under a master, by means of a carbon-arc lamp or mercury vapor lamp, the parts affected by the light become insoluble in organic and aqueous solvents while the parts of the coating not affected by the light can be removed with appropriate solvents, e.g., dioxane, dimethyl formamide, cyclohexane, methyl cyclohexane, gasoline, and the like, if necessary in the presence of groups conferring alkali-solubility, such as phenolic, hydroxyl or carboxyl groups, aqueous alkalis or solutions of salts with alkaline action. Advantageously, however, if resin combinations are employed, the unexposed parts are removed with dilute alkalis or with solutions of salts having alkaline action, such as trisodium phosphate, disodium phosphate, and the like. Also, aqueous sodium silicate solutions may be used as developers. Additions of small quantities of organic solvents, such as triethylene glycol, accelerate the development process while glycerine improves the ease of handling of the developer. These latter developers have the great advantage over purely organic solvents that after-treatment of the development foil with phosphoric acid to improve hydrophilic properties is no longer necessary.

The resultant image, which is composed of an insoluble, polymeric, light-conversion product, can be inked up with greasy ink. In this way, positive images are obtained from negative masters or negative images from positive masters.

The reproduction coatings of the invention that have been treated in this way, after exposure and development with solvents, give very long-lasting and strong images. Results which are particularly favorable are obtained by the invention if the resins specified above are used. By the introduction of these resins into the reproduction coating, the uniformity of the film-like coating on the support and the adhesive properties of the image are improved.

The coatings prepared in accordance with the present invention, particularly those combined with resins, possess outstanding resistance to mechanical strain, so that a considerable increase in the length of run obtainable from a printing plate is achieved. Further, the light-sensitive material of the invention has long shelf life in the unexposed state, even in unfavorable climatic conditions, so that the printing foil can be used without decreased efficacy even after prolonged storage.

A further advantage is the clear yellow to red-orange color of the image produced with the thiazolidones herein described, after exposure and development. It has also proved advantageous for known substances such as dicinnamoyl methane or dicinnamoylidene acetone to be added to the light-sensitive coating. These facilitate the cross-linking of appropriate unsaturated compounds caused by ultra violet light and hasten photopolymerization.

The invention will be further illustrated by reference to the following specific examples:

EXAMPLE I 1.5 parts by weight of the compound corresponding to Formula 1 are dissolved in 100 parts by volume of dimethyl formamide and this solution is coated upon a mechanically roughened aluminum foil. The foil is dried in a hot air current and then further dried for one to two minutes at 100° C. The foil thus sensitized is exposed for 3 minutes under a negative master and, for this purpose, an enclosed 18-amp arc lamp is used at a distance of about 70 cm. For the development of the image produced on the coating, the exposed side of the foil is treated with a cotton pad soaked in methyl cyclohexane. The image appears in yellow on a metal background. The developed foil is rinsed well with water, wiped over with 1% phosphoric acid, to improve hydrophilic properties in the bared parts of the supporting material, and then linked up with greasy ink. With the printing plate thus prepared, copies can be prepared in a printing machine.

For the preparation of the compound corresponding to Formula 1 35.5 parts by weight (0.2 mole) of 4-amino-cinnamic acid methyl ester are dissolved in 400 parts by volume of anhydrous benzene and this solution is heated under reflux with 27 parts by weight (0.2 mole) of phenyl mustard oil until the diphenyl thiourea-4-acrylic acid methyl ester begins to crystallize out. After cooling, the reaction product is filtered off and recrystallized from glacial acetic acid or from xylene. Yellow crystals that melt at 160° C. are obtained.

For cyclization to the tetrahydrothiazole, 15.6 parts by weight (0.05 mole) of diphenyl-thiourea-4-acrylic-acid-methyl-ester and 5.65 parts by weight (0.05 mole) of chloroacetyl chloride are dissolved in 500 parts by volume of acetone and the solution is kept at boiling for one hour under reflux in the presence of 4 parts by weight of pyrridine. The reaction solution is then acidified with acetic acid and finally poured upon finely broken ice, with thorough stirring. The resultant 2-phenylimino-3-[phenyl-(4-acrylic acid methyl ester)]-thiazolidone-(4) is recrystallized from methanol, acetic ester or butyl acetate. Bright yellow crystals are formed that melt at 178° C.

For the preparation of 2-phenylimino-5-furfuracrylidene-3-(phenyl-(4-acrylic methyl-ester))-thiazolidon-(4), corresponding to Formula 1, 3.5 parts by weight (0.01 mole) of 2-phenylimino-3-phenyl-acrylic methyl-ester-thiazolidone-(4) and 1.2 parts by weight (0.01 mole) of β-(2-furyl)-acrolein are dissolved in 300 parts by volume of ethanol and, in the presence of 1 part by volume of piperidine, kept boiling for about an hour.

The crystals of the compound represented in Formula 1, which separate out on cooling, are recrystallized from xylene. Yellow prisms are obtained which melt at 207° C.

EXAMPLE II 1.5 parts by weight of the compound represented by Formula 2 are dissolved in 100 parts by volume of dimethyl formamide and with this solution a mechanically roughened aluminum foil is coated. The foil is first dried in a current of hot air and then, for about 1 minute, further dried at 100° C. The sensitized foil is exposed under a negative master for about 2 minutes to an 18-amp enclosed carbon arc lamp at a distance of 70 cm. To develop the latent image, which is already well delineated, the exposed side of the foil is treated with a cotton pad soaked in cyclohexane. The image, corresponding to the master, appears in yellow on metal background. The image side is well rinsed with water, wiped over with a cotton pad that has been soaked in about 1% phosphoric acid and then inked up with greasy ink. From the printing plate thus obtained, prints can be made in a printing machine.

For the preparation of the compound corresponding to Formula 2, 19.2 parts by weight (0.1 mole) of allyl-phenyl-thiourea and 10.7 parts by weight (0.1 mole) of pyridine are dissolved in 200 parts by volume of acetone and 11.3 parts by weight (0.1 mole) of chloroacetyl-chloride are added dropwise. Vigorous reaction immediately occurs. The reaction product is maintained at boiling temperature for another half hour and is then diluted with water. The precipitated 2-allyl-imino-3-phenyl-thiazolidone-(4) is filtered off. Recrystallization from methanol or benzene gives colorless prisms that melt at 151° C.

Substitution in the 5-position is obtained if an alcoholic solution of 4.6 parts by weight (0.02 mole) of 2-allyl-imino-3-phenyl-thiazolidone-(4) and 5.3 parts by weight (0.02 mole) of 4-($\beta$-anisoyl-vinyl) benzaldehyde is heated for one hour in the presence of 1 part by volume of piperidine. The condensation product is precipitated from xylene, from which it crystallizes out in yellow prisms which melt at 185° C.

Printing plates can be prepared with equally good results by procedures analogous to that described in Examples I and II using the compounds listed in the following table which correspond to Formulae 3–17. In the table, the solvent and the developer solution for the compounds are given. The abbreviations are as follows:

MGL: ethyleneglycol monomethyl ether
DMF: dimethyl formamide

*Table*

| Formula No. | Solvent | Developer |
|---|---|---|
| 3 | MGL | 1% aqueous sodium triphosphate solution. |
| 4 | MGL | Cyclohexane. |
| 5 | DMF | Methylcyclohexane. |
| 6 | MGL | Cyclohexane. |
| 7 | DMF | Methycyclohexane. |
| 8 | DMF | Do. |
| 9 | MGL | Do. |
| 10 | DMF | Do. |
| 11 | MGL | 1% aqueous sodium triphosphate solution. |
| 12 | MGL | 3% aqueous sodium triphosphate solution. |
| 13 | DMF | Gasoline. |
| 14 | MGL | Do. |
| 15 | MGL | Cyclohexane. |
| 16 | MGL | Do. |
| 17 | MGL | 0.5% aqueous sodium triphosphate solution. |

The composition of these developers may be differently selected to obtain specific effects, e.g., a particularly gentle or particularly rapid development of the copy or, for example, by the addition of dyestuffs, the copy may be caused to take on color simultaneously with development. The copy can, however, be subsequently colored or strengthened with the aid of a lacquer.

For the preparation of the compound corresponding to Formula 3, 24.9 parts by weight (0.1 mole) of anisylidene-propenyl-thiosemicarbazone are dissolved in 200 parts by volume of absolute ethyl alcohol and this solution, together with 2.3 parts by weight of sodium dissolved in a little absolute ethyl alcohol, is maintained at the boiling point for about five minutes. After cooling, 12.25 parts by weight (0.1 mole) of chloroacetic acid ethyl ester are added dropwise to the reaction solution. There is a strong exothermic reaction and a yellow precipitate is formed which, after five minutes boiling, is filtered off. The product is purified by recrystallization from methanol. The 2,4-diketo-3-allyl-tetrahydrothiazole-2-anisylidine-hydrazone crystallizes in colorless needles which melt at 129° C. The 2,4-diketo-3-allyl-5-piperonylidene-tetrahydrothiazole-2-anisylidene hydrazone corresponding to Formula 3 is obtained when 2.9 parts by weight (0.01 mole) of 2,4-diketo-3-allyl-tetrahydrothiazole-2-anisylidene hydrazone and 1.5 parts by weight (0.01 mole) of piperonal in alcoholic solution are maintained at boiling temperature for one hour in the presence of 1 part by volume of piperidine. The condensation product crystallizes from xylene in yellow needles that melt at 173° C.

For the preparation of the compound corresponding to Formula 4, 23.2 parts by weight (0.1 mole) of 2-allyl-imino-3-phenyl-thiazolidone-(4) are dissolved in 250 parts by volume of ethyl alcohol and, after the addition of 13.2 parts by weight (0.1 mole) of cinnamaldehyde and 2 parts by volume of piperidine, the solution is heated under reflux to boiling for one hour. After cooling, the reaction solution solidifies to a brown yellow mass. The 2-allylimino-3-phenyl-5-cinnamylidene-thiazolidone-crystallizes from alcohol in yellow needles that melt at 190° C.

For the preparation of the compound corresponding to Formula 5, 28.9 parts by weight (0.1 mole) of 2,4-diketo-3-allyl-tetrahydro-thiazole-2-anisylidene hydrazone and 13.2 parts by weight of cinnamaldehyde (0.1 mole) are dissolved in 1000 parts by volume of ethyl alcohol and, in the presence of 2 parts by volume of piperidine, maintained at boiling temperature for 30 minutes under reflux. As the reaction mixture cools, the 2,4-diketo-3-allyl-5-cinnamylidene-tetrahydrothiazole-2-anisylidene hydrazone precipitates out in the form of yellow prisms which melt at 192° C.

For the preparation of the compound corresponding to Formula 6, 2.9 parts by weight (0.01 mole) of 2,4-diketo - 3-allyl-tetrahydrothiazole-2,anisylidene hydrazone and 2.6 parts by weight (0.01 mole) of 4-$\beta$-anisoyl-vinyl)-benzaldehyde are dissolved in 200 parts by volume of ethyl alcohol and, after the addition of 1 part by volume of piperidine, the solution is boiled for two hours. The condensation product which crystallizes out as the reaction mixture cools is purified by recrystallization from xylene. Yellow prisms that melt at 155° C. are obtained.

For the preparation of the compound corresponding to Formula 7, 28.9 parts by weight (0.1 mole) of 2,4-diketo-3-allyl-tetra-hydrothiazole-2-anisylidene hydrazone and 6.7 parts by weight (0.05 mole) of terephthaldialdehyde are dissolved in 1000 parts by volume of ethyl alcohol and boiled for one hour under reflux in the presence of 2 parts by volume of piperidine. The condensation product which separates out as the mixture cools is recrystallized from dioxane. Yellow crystals which melt at 227° C. are obtained.

For the preparation of the compound corresponding to Formula 8, 19.6 parts by weight (0.1 mole) of N-hydroxy-ethyl-N'-phenyl-thiourea and 12.25 parts by weight (0.1 mole) of chloroacetic acid ethyl ester are dissolved in 100 parts by volume of ethyl alcohol and boiled for 5 hours under reflux in the presence of 9 parts by volume of pyridine. After the reaction solution has cooled, it is diluted with three times its volume of ice water whereupon the reaction product, which at first forms an oily precipitate, gradually solidifies. The 3-($\beta$-hydroxy ethyl)-2-phenylimino-thiazolidone-(4) is recrystallized from benzene. Colorless needles that melt at 86° C. are obtained.

The compound corresponding to Formula 8 is obtained when 4.7 parts by weight (0.02 mole) of 3-($\beta$-hydroxy-ethyl)-2-phenyliminothiazolidone-(4) and 5.2 parts by weight (0.02 mole) of 4-($\beta$-anisoylvinyl)-benzaldehyde are heated for one hour in 200 parts by volume of ethyl alcohol in the presence of a few drops of piperidine. Yellow prisms that melt at 215° C. are obtained after recrystallization from xylene.

For the preparation of the compound corresponding to Formula 9, 19.6 parts by weight (0.1 mole) of N-hydroxyethyl-N'-phenyl-thiourea and 12.25 parts by weight (0.1 mole) of chloroacetic acid ethyl ester are dissolved in 100 parts by volume of ethyl alcohol and boiled for five hours under reflux in the presence of 9 parts by volume of pyridine. After the reaction solution has cooled, it is diluted with three times its volume of ice water, whereupon the reaction product which at first precipitates in the form of an oil, gradually solidifies. The 3-(β-hydroxy-ethyl)-2-phenylimino-thiazolidone-(4) is recrystallized from benzene. Colorless needles that melt at 86° C. are obtained.

The condensation product corresponding to Formula 9 is obtained when 23.6 parts by weight (0.1 mole) of 3-(β-hydroxyethyl)-2-phenylimino-thiazolidone-(4) and 13.2 parts by weight (0.1 mole) of cinnamaldehyde are heated for three hours in 100 parts by volume of ethyl alcohol in the presence of a few drops of piperidine as condensation agent. After recrystallization from alcohol, yellow needles are obtained which melt at 154° C.

For the preparation of the compound corresponding to Formula 10, 23.6 parts by weight (0.1 mole) of 3-(β-hydroxyethyl)-2-phenyl-imino-thiazolidone-(4) and 17.5 parts by weight (0.1 mole) of 4-dimethylamino-cinnamaldehyde are dissolved in 250 parts by volume of ethyl alcohol and boiled for one hour in the presence of 1 part by volume of piperidine. The condensation product which crystallizes out is purified by recrystallization from xylene. The 3-(β-hydroxyethyl)-2-phenylimino-5-(4-dimethylamino)-cinnamylidene-thiazolidone-(4) is obtained in the form of red prisms which melt at 203° C.

For the preparation of the compound corresponding to Formula 11, 23.2 parts by weight (0.1 mole) of 2-allyl-imino-3-phenyl-thiazolidone-(4) and 12.2 parts by weight (0.1 mole) of β-furyl-(2)-acrolein are dissolved in 300 parts by volume of ethyl alcohol and heated for two hours under reflux in the presence of 2 parts by volume of piperidine. The crystals which separate out as the reaction mixture cools are filtered off and washed with methanol. For purification, the condensation product is heated for a short time in benzene solution in the presence of activated carbon, filtered and precipitated with petroleum. Yellow crystals which melt at 150° C. are obtained.

For the preparation of the compound corresponding to Formula 12, 23.6 parts by weight (0.1 mole) of 3-(β-hydroxethyl)-2-phenyl-imino-thiazolidone-(4) and 13.6 parts by weight (0.1 mole) of 6-hydroxy-3-methyl-benzaldehyde are dissolved in 200 parts by volume of ethyl alcohol and boiled for two hours in the presence of 1 part by volume of piperidine. The condensation product which separates out as the reaction mixture cools is recrystallized from ethyl alcohol. Yellow prisms which melt at 199° C. are obtained.

For the preparation of the compound corresponding to Formula 13, 2.9 parts by weight (0.01 mole) of 2,4-diketo - 3-allyl-tetrahydrothiazole-2-anisylidene hydrazone and 1 part by weight (0.01 mole) of pyridine-4-aldehyde are dissolved in 100 parts by volume of ethyl alcohol and, after the addition of 1 part by volume of piperidine, boiled for 2 hours. The reaction product is purified by recrystallization from ethyl alcohol. Yellow prisms which melt at 165° C. are obtained.

For the preparation of the compound corresponding to Formula 14, 23.6 parts by weight (0.1 mole) of 3-(β-hydroxyethyl) - 2 - phenyl-iminothiazolidone-(4) and 15.6 parts by weight (0.1 mole) of 1-naphthaldehyde are dissolved in 100 parts by volume of ethyl alcohol and boiled for about one hour under reflux in the presence of 1 part by weight of piperidine. The condensation product which precipitates out is purified by recrystallization from ethyl alcohol. Yellow crystals which melt at 148° C. are obtained.

For the preparation of the compound corresponding to Formula 15, 2.9 parts by weight (0.01 mole) of 2,4-diketo-3-allyl-tetrahydrothiazole-2-anisylidene hydrazone and 1.3 parts by weight (0.01 mole) of 4-methoxybenzaldehyde are dissolved in 200 parts by volume of hot ethyl alcohol. After the addition of 1 part by volume of piperidine, the reaction solution is boiled under reflux for 2 to 3 hours. The condensation product which crystallizes out of the solution is recrystallized from ethyl alcohol. Yellow prisms which melt at 156° C. are obtained.

For the preparation of the compound corresponding to Formula 16, 23.6 parts by weight (0.1 mole) of 3-(β-hydroxyethyl)-2-phenyl-iminothiazolidone-(4) and 15.1 parts by weight (0.1 mole) of 4-nitro-benzaldehyde are dissolved in 200 parts by volume of ethyl alcohol and boiled under reflux for 3 hours in the presence of 2 parts by volume of piperidine. The condensation product is recrystallized from ethyl alcohol. Yellow crystals which melt at 165° C. are obtained.

For the preparation of the compound corresponding to Formula 17, 23.2 parts by weight 0.1 mole of 2-allyl-imino-3-phenyl-thiazolidone-(4) and 15.2 (0.1 mole) of 4-hydroxy-3-methoxy-benzaldehyde (vanillin) are dissolved in 250 parts by volume of ethyl alcohol and heated under reflux for two hours in the presence of 2 parts by volume of piperidine. The crystals which separate out as cooling takes place are recrystallized from ethyl alcohol. Yellow prisms which melt at 155° C. are obtained.

EXAMPLE III 0.3 part by weight of the compound corresponding to Formula 4 and a 0.1 part by weight of an alkali-soluble phenol-formaldehyde novolak, in this case a phenol resin with a melting point of 108–118° C. and an acid number of 0, are dissolved in 20 parts by volume of dimethyl formamide and this solution is coated upon a mechanically roughened aluminum foil. The foil is dried in a current of hot air and then further dried for about 2 minutes at 100° C. The sensitized foil is exposed for 2 minutes to an enclosed 18-amp arc lamp at a distance of 70 cm. under a negative master. For the development of the image produced on the coating, the exposed side of the foil is treated with a developer, the composition of which is described below, by means of a cotton pad or a cellulose sponge. Excess developer is rinsed away with water. The image parts consist of an oleophilic stencil, which, when inked up by hand with greasy ink or in one of the normal printing machines, readily accept accepts ink while the image-free parts have hydrophilic character and repel the ink. From the printing plate thus obtained, copies can be produced in a printing machine.

Composition of the developer:

50 parts by weight of sodium metasilicate ($9H_2O$)
700 parts by volume of water
200 parts by volume of glycerine
500 parts by volume of triethyleneglycol

EXAMPLE IV 0.3 part by weight of the compound corresponding to Formula 9, 0.3 part by weight of an alkali-soluble phenol-formaldehyde novolak modified with chloroacetic acid and 0.2 part by weight of dicinnanmylidene acetone are dissolved in 100 parts by volume of ethylene glycol monomethyl ether. This solution is coated upon an aluminum foil in accordance with known methods. The foil is dried with a hot current of air and then further dried for 1 to 2 minutes at 100° C. The sensitized foil is exposed to light under a negative master, e.g., for about 1 to 2 minutes to an enclosed 18-amp carbon arc lamp at a distance of 70 cm. For the development of the image produced on the coating, the exposed side of the foil is treated with the developer described in Example III. The image appears in yellow on metal background. The developed foil is rinsed well with water and can be immediately inked up with greasy ink. From the resultant printing plate copies can be prepared in a printing machine. The yellow image resulting from development may be treated with a lacquer emulsion before being inked up with greasy ink and for this purpose an appropriate quantity of the emulsion lacquer described below is poured upon the aluminum foil while it is still moist and, without any pressure being used, spread with sweeping movements over the whole sheet. Any excess is advantageously removed by means of a water spray. The plate can now either be stored or used immediately on the printing machine. The lacquer emulsion increases the thickness of the coating on the stencil, protects it against mechanical abrasion and allows long runs to be made.

| | Parts |
|---|---|
| Non-aqueous phase: | |
| Methyl glycol acetate | 50 |
| Xylene | 25 |
| Oil-modified alkyd resin strengthened by built-in aluminum with an oil content of about 60% and an acid number below 10 | 13.5 |
| Ceres Red | 1 |
| Pigment Red B | 3 |
| Aqueous phase: | |
| Gum arabic | 30 |
| Phenol | 0.5 |
| Nekal BX | 1 |
| Water | 150 |

EXAMPLE V 0.2 part by weight of the compound corresponding to Formula 3 and 0.05 part by weight of a novolak modified with chloroacetic acid are dissolved in 20 parts by volume of dimethyl formamide in the presence of 0.03 part by weight of benzoin monomethyl ether. This solution is coated upon a mechanically roughened aluminum foil by the method described in Example I and then dried. As described in detail in Examples III and IV, the sensitized foil is exposed for 2 minutes under a negative master. For the development of the image produced on the coating, the exposed side of the foil is treated by means of a cotton pad with the developer described below. Excess developer is rinsed away with water and the image parts are inked up with greasy ink. The resultant printing plate can be used for the preparation of copies on a printing press.

Composition of the developer:

- 50 parts by weight of sodium metasilicate ($9H_2O$)
- 250 parts by volume of water
- 200 parts by volume of glycerine
- 500 parts by volume of triethyleneglycol

EXAMPLE VI 0.1 part by weight of the compound corresponding to Formula 9, 0.05 part by weight of dicinnamylidene acetone and 0.05 part by weight of an interpolymer made up of equal parts of 4-nitrostyrene and maleic anhydride are dissolved in 20 parts by volume of dimethyl formamide. This solution is coated in accordance with known methods upon a mechanically roughened aluminum foil and then exposed for two minutes under a negative master in the same manner as in Examples III and IV. The resultant latent image is treated with the developer described in Example V with the aid of a cotton pad or a cellulose sponge. The image appears in yellow on metal background. After excess developer has been rinsed away with water, the foil can be immediately inked up with greasy ink. From the printing plate thus obtained copies can be prepared in a printing machine.

It will be obvious to those skilled in the art that many modifications may be made within the scope of the present invention without departing from the spirit thereof, and the invention includes all such modifications.

What is claimed is:

1. A presensitized printing plate comprising a base material having a coating thereon, the coating comprising a compound having the formula

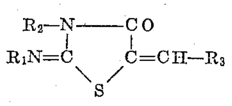

in which $R_1$ is selected from the group consisting of an aryl group and an aliphatic group, and an aralkyl group linked through nitrogen, $R_2$ is selected from the group consisting of an aryl group and an aliphatic group and $R_3$ is selected from the group consisting of an aryl group, an aliphatic group and a heterocyclic group.

2. A presensitized printing plate according to claim 1 in which the coating includes an alkali-soluble resin.

3. A presensitized printing plate according to claim 1 in which the coating includes a water-soluble resin.

4. A presensitized printing plate comprising a base material having a coating thereon, the coating comprising a compound having the formula

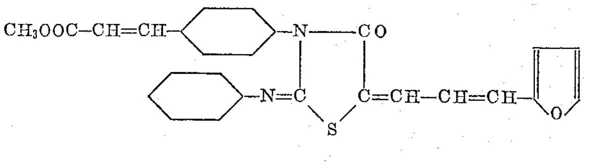

5. A presensitized printing plate comprising a base material having a coating thereon, the coating comprising a compound having the formula

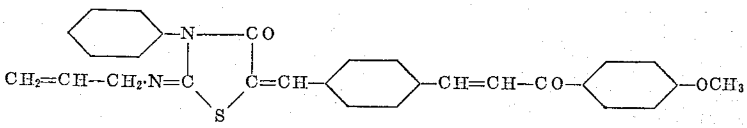

6. A presensitized printing plate comprising a base material having a coating thereon, the coating comprising a compound having the formula

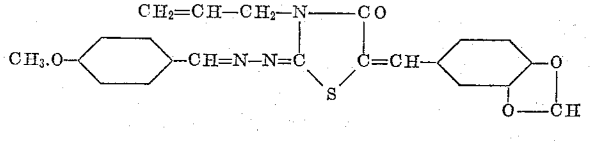

7. A presensitized printing plate comprising a base material having a coating thereon, the coating comprising a compound having the formula

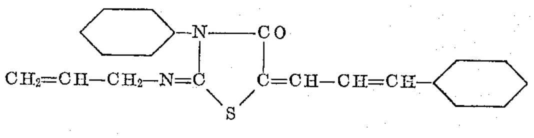

8. A presensitized printing plate comprising a base material having a coating thereon, the coating comprising a compound having the formula

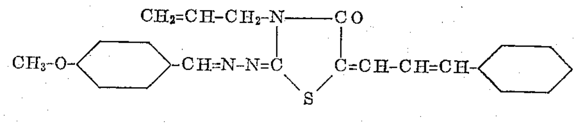

9. A presensitized printing plate comprising a base material having a coating thereon, the coating comprising a compound having the formula

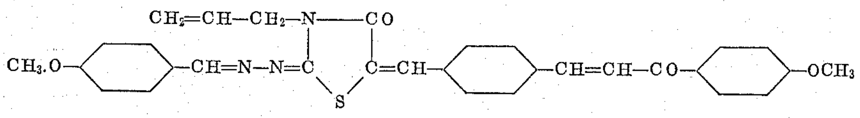

10. A presensitized printing plate comprising a base material having a coating thereon, the coating comprising a compound having the formula

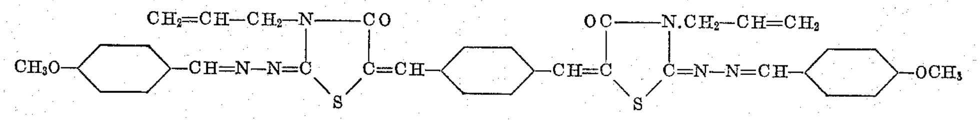

11. A presensitized printing plate comprising a base material having a coating thereon, the coating comprising a compound having the formula

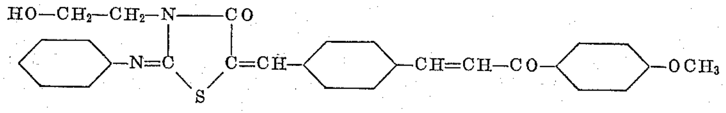

12. A presensitized printing plate comprising a base material having a coating thereon, the coating comprising a compound having the formula

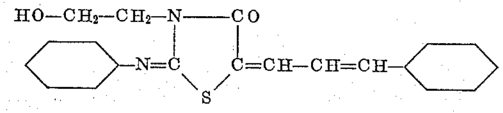

13. A presensitized printing plate comprising a base material having a coating thereon, the coating comprising a compound having the formula

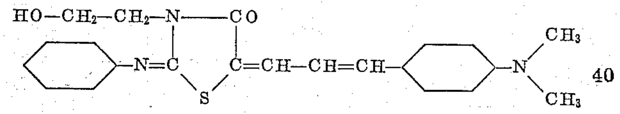

14. A presensitized printing plate comprising a base material having a coating thereon, the coating comprising a compound having the formula

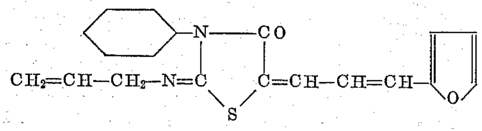

15. A presensitized printing plate comprising a base material having a coating thereon, the coating comprising a compound having the formula

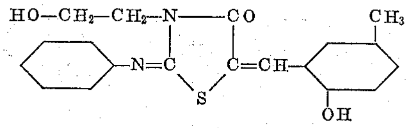

16. A presensitized printing plate comprising a base material having a coating thereon, the coating comprising a compound having the formula

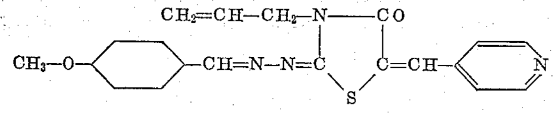

17. A presensitized printing plate comprising a base material having a coating thereon, the coating comprising a compound having the formula

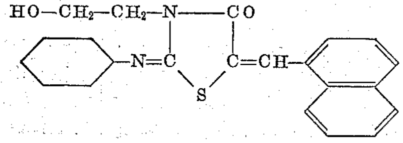

18. A presensitized printing plate comprising a base material having a coating thereon, the coating comprising a compound having the formula

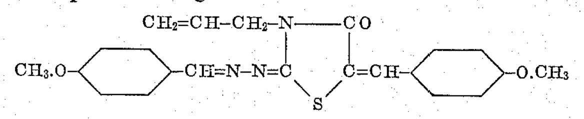

19. A presensitized printing plate comprising a base material having a coating thereon, the coating comprising a compound having the formula

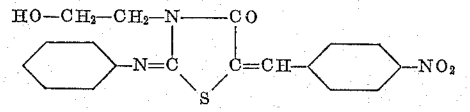

20. A presensitized printing plate comprising a base material having a coating thereon, the coating comprising a compound having the formula

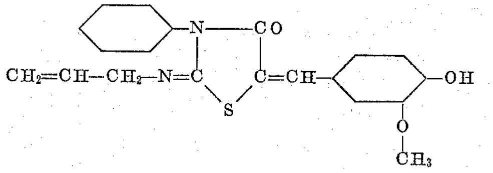

21. A process for developing a printing plate which comprises exposing a coated base material to light under a master and treating the resulting image with a developer whereby those portions of the coating not struck by light are removed, the coating comprising a compound having the formula

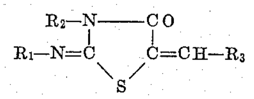

in which $R_1$ is selected from the group consisting of an aryl group, an aliphatic group, and an aralkyl group linked through nitrogen, $R_2$ is selected from the group consisting of an aryl group and an aliphatic group and $R_3$ is selected from the group consisting of an aryl group, an aliphatic group and a heterocyclic group.

22. A process according to claim 21 in which the coating includes an alkali-soluble resin.

23. A process according to claim 21 in which the coating includes a water-soluble resin.

24. A process for developing a printing plate which comprises exposing a coated base material to light under a master and treating the resulting image with a developer whereby those portions of the coating not struck by light are removed, the coating comprising a compound having the formula

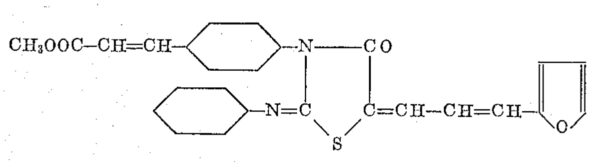

25. A process for developing a printing plate which comprises exposing a coated base material to light under a master and treating the resulting image with a developer whereby those portions of the coating not struck by light are removed, the coating comprising a compound having the formula

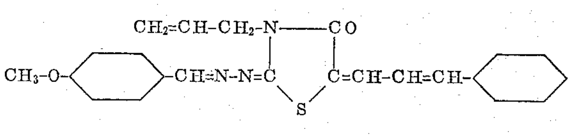

29. A process for developing a printing plate which comprises exposing a coated base material to light under a master and treating the resulting image with a developer whereby those portions of the coating not struck by light are removed, the coating comprising a compound having the formula

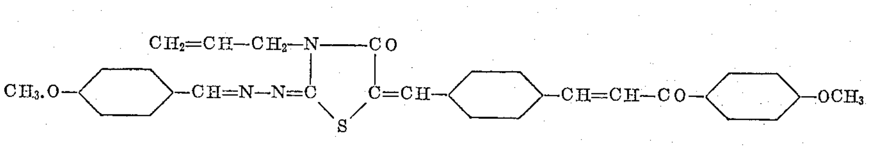

are removed, the coating comprising a compound having the formula

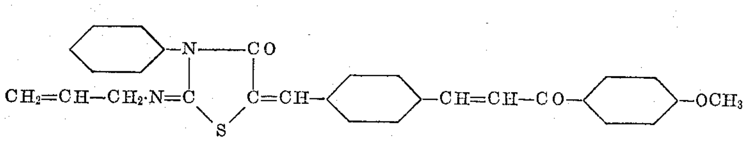

26. A process for developing a printing plate which comprises exposing a coated base material to light under a master and treating the resulting image with a developer whereby those portions of the coating not struck by light 30. A process for developing a printing plate which comprises exposing a coated base material to light under a master and treating the resulting image with a developer whereby those portions of the coating not struck by light are removed, the coating comprising a compound having the formula

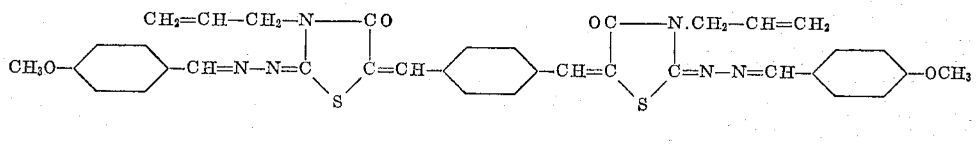

are removed, the coating comprising a compound having the formula

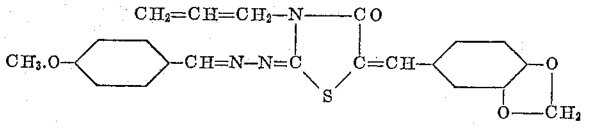

31. A process for developing a printing plate which comprises exposing a coated base material to light under a master and treating the resulting image with a developer whereby those portions of the coating not struck by light are removed, the coating comprising a compound having the formula

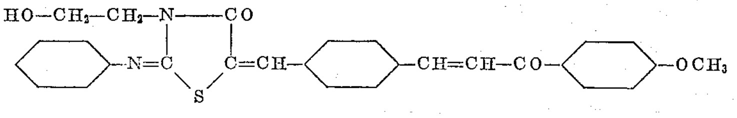

27. A process for developing a printing plate which comprises exposing a coated base material to light under a master and treating the resulting image with a developer whereby those portions of the coating not struck by light are removed, the coating comprising a compound having the formula

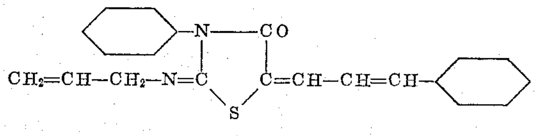

28. A process for developing a printing plate which comprises exposing a coated base material to light under a master and treating the resulting image with a developer whereby those portions of the coating not struck by light 32. A process for developing a printing plate which comprises exposing a coated base material to light under a master and treating the resulting image with a developer whereby those portions of the coating not struck by light are removed, the coating comprising a compound having the formula

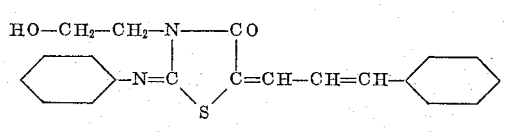

33. A process for developing a printing plate which comprises exposing a coated base material to light under a master and treating the resulting image with a developer whereby those portions of the coating not struck by light are removed, the coating comprising a compound having the formula

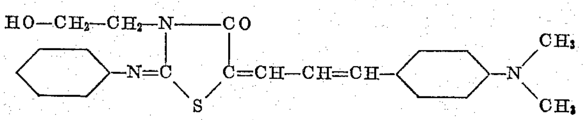

34. A process for developing a printing plate which comprises exposing a coated base material to light under a master and treating the resulting image with a developer whereby those portions of the coating not struck by light are removed, the coating comprising a compound having the formula

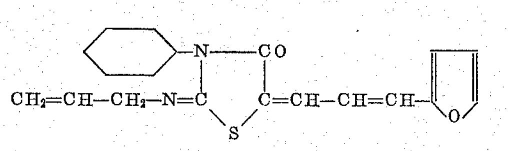

35. A process for developing a printing plate which comprises exposing a coated base material to light under a master and treating the resulting image with a developer whereby those portions of the coating not struck by light are removed, the coating comprising a compound having the formula

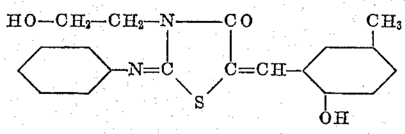

36. A process for developing a printing plate which comprises exposing a coated base material to light under a master and treating the resulting image with a developer whereby those portions of the coating not struck by light are removed, the coating comprising a compound having the formula

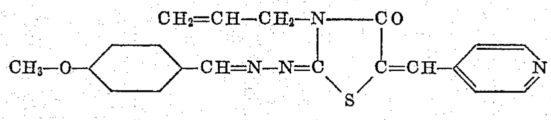

37. A process for developing a printing plate which comprises exposing a coated base material to light under a master and treating the resulting image with a developer whereby those portions of the coating not struck by light are removed, the coating comprising a compound having the formula

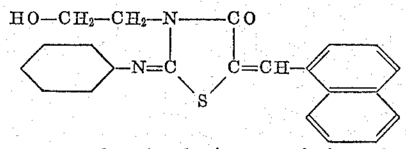

38. A process for developing a printing plate which comprises exposing a coated base material to light under a master and treating the resulting image with a developer whereby those portions of the coating not struck by light are removed, the coating comprising a compound having the formula

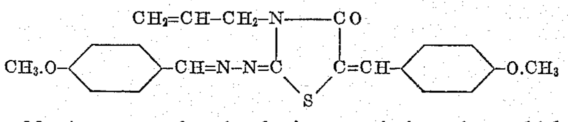

39. A process for developing a printing plate which comprises exposing a coated base material to light under a master and treating the resulting image with a developer whereby those portions of the coating not struck by light are removed, the coating comprising a compound having the formula

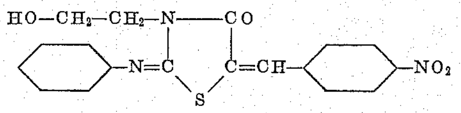

40. A process for developing a printing plate which comprises exposing a coated base material to light under a master and treating the resulting image with a developer whereby those portions of the coating not struck by light are removed, the coating comprising a compound having the formula

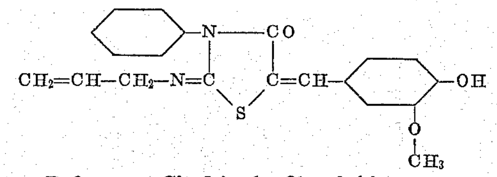

References Cited in the file of this patent

UNITED STATES PATENTS

| | | |
|---|---|---|
| 2,719,162 | Sawdey et al. | Sept. 27, 1955 |
| 2,739,971 | Sawdey et al. | Mar. 27, 1956 |
| 2,875,053 | Minsk | Feb. 24, 1959 |
| 2,987,503 | Van Allan | June 6, 1961 |

FOREIGN PATENTS

| | | |
|---|---|---|
| 1,058,844 | Germany | June 4, 1959 |